United States Patent
Marchini et al.

(10) Patent No.: US 10,688,744 B2
(45) Date of Patent: Jun. 23, 2020

(54) PROCESS AND PLANT FOR BUILDING TYRES

(71) Applicant: Pirelli Tyre S.p.A., Milan (IT)

(72) Inventors: Maurizio Marchini, Milan (IT); Gianni Mancini, Milan (IT)

(73) Assignee: PIRELLI TYRE, S.P.A., Milan (IT)

( * ) Notice: Subject to any disclaimer, the term of this patent is extended or adjusted under 35 U.S.C. 154(b) by 643 days.

(21) Appl. No.: 14/795,619

(22) Filed: Jul. 9, 2015

(65) Prior Publication Data

US 2015/0375466 A1   Dec. 31, 2015
US 2018/0264763 A2   Sep. 20, 2018

Related U.S. Application Data

(62) Division of application No. 13/517,499, filed as application No. PCT/IB2010/055165 on Nov. 15, 2010, now Pat. No. 9,108,372.

(Continued)

(30) Foreign Application Priority Data

Dec. 21, 2009   (IT) .......................... MI2009A02241

(51) Int. Cl.
   *B29D 30/20*   (2006.01)
   *B29D 30/00*   (2006.01)
   (Continued)

(52) U.S. Cl.
   CPC .......... *B29D 30/20* (2013.01); *B29D 30/005* (2013.01); *B29D 30/0016* (2013.01);
   (Continued)

(58) Field of Classification Search
   CPC .............. B29D 30/005; B29D 30/0603; B29D 2030/0055; B29D 2030/105;
   (Continued)

(56) References Cited

U.S. PATENT DOCUMENTS 2,818,907 A * 1/1958 Sapp ..................... B29D 30/26
                                                         156/396
3,388,024 A    6/1968 Black et al.
(Continued)

FOREIGN PATENT DOCUMENTS

CN   101084107 A   12/2007
DE   199 18 523 C1   4/2000
(Continued)

OTHER PUBLICATIONS

Throughput Optimization in Robotic Cells Dawnade et al Springer's International Series, 2007 (Year: 2007).*

(Continued)

*Primary Examiner* — Robert C Dye
*Assistant Examiner* — Sedef E Paquette
(74) *Attorney, Agent, or Firm* — Finnegan, Henderson, Farabow, Garrett & Dunner, LLP

(57) ABSTRACT

A plant for building tyres includes a plurality of working locations, at least one first working location being associated with at least two loading/unloading locations, a proximal one and a distal one, each of said working locations and loading/unloading locations being associable with a forming drum. The production cycle is controlled by the method of: (i) loading a first forming drum into the at least one first working location; (ii) loading a second forming drum into the loading/unloading location; (iii) at the end of the working provided in the at least one first working location, unloading the first forming drum into the proximal loading/unloading location.

12 Claims, 5 Drawing Sheets

Related U.S. Application Data

(60) Provisional application No. 61/282,314, filed on Jan. 20, 2010.

(51) Int. Cl.
  *B29D 30/24* (2006.01)
  *B29D 30/26* (2006.01)
  *B65G 47/90* (2006.01)

(52) U.S. Cl.
  CPC ......... *B29D 30/24* (2013.01); *B29D 30/2607* (2013.01); *B65G 47/907* (2013.01); *B29D 2030/202* (2013.01); *B29D 2030/206* (2013.01); *B29D 2030/207* (2013.01)

(58) Field of Classification Search
  CPC ........ B29D 2030/202; B29D 2030/203; B29D 2030/204; B29D 30/0016; B29D 30/20; B29D 30/24; B29D 30/2607; B29D 2030/205; B29D 2030/206; B29D 2030/207; B65G 47/907
  USPC .............................................. 156/110.1, 111
  See application file for complete search history.

(56) References Cited

U.S. PATENT DOCUMENTS

| | | | | |
|---|---|---|---|---|
| 3,687,756 | A * | 8/1972 | Appleby | B29D 30/2607 156/111 |
| 3,717,529 | A | 2/1973 | Rattray et al. | |
| 4,197,068 | A | 4/1980 | Pizzorno | |
| 4,443,290 | A * | 4/1984 | Loeffler | B29D 30/0016 156/111 |
| 4,443,920 | A | 4/1984 | Loeffler et al. | |
| 4,732,640 | A | 3/1988 | Goodfellow | |
| 5,217,562 | A | 6/1993 | Macchiarulo et al. | |
| 5,540,803 | A * | 7/1996 | Miyamoto | B29D 30/005 156/111 |
| 5,564,889 | A * | 10/1996 | Araki | H01L 21/68707 414/222.01 |
| 6,331,095 | B1 * | 12/2001 | Hiroki | H01L 21/68742 414/222.01 |
| 6,738,686 | B2 | 5/2004 | Caretta et al. | |
| 6,746,195 | B2 | 6/2004 | Shirai | |
| 7,195,047 | B2 * | 3/2007 | Sieverding | B29D 30/0601 156/396 |
| 9,039,853 | B2 | 5/2015 | Mancini et al. | |
| 9,108,372 | B2 * | 8/2015 | Marchini | B29D 30/005 |
| 2002/0174939 | A1 * | 11/2002 | Caretta | B29D 30/00 156/118 |
| 2002/0189744 | A1 * | 12/2002 | Caretta | B29D 30/00 156/110.1 |
| 2005/0189399 | A1 * | 9/2005 | Kilibarda | B23K 37/047 228/47.1 |
| 2005/0194101 | A1 | 9/2005 | Caretta et al. | |
| 2006/0108051 | A1 * | 5/2006 | Lacagnina | B29D 30/0016 156/111 |
| 2007/0068617 | A1 * | 3/2007 | De Paoli | B29D 30/0016 156/111 |
| 2008/0196817 | A1 | 8/2008 | Mancini | |
| 2010/0032864 | A1 | 2/2010 | Marchini et al. | |
| 2010/0307662 | A1 | 12/2010 | Mancini et al. | |

FOREIGN PATENT DOCUMENTS

| | | | |
|---|---|---|---|
| EP | 1 481 791 A2 | 12/2004 | |
| EP | 1 312 462 B1 | 10/2006 | |
| JP | S53-147780 A | 12/1978 | |
| JP | 2000-167944 A | 6/2000 | |
| JP | 2002-370291 A | 12/2002 | |
| JP | 2002-370294 A | 12/2002 | |
| JP | 2006-297778 * | 11/2006 | ............. B29D 30/16 |
| JP | 2006-297778 A | 11/2006 | |
| KR | 10-2007-0091014 A | 9/2007 | |
| RU | 2 258 608 C2 | 8/2005 | |
| WO | WO 02/17904 A1 | 3/2002 | |
| WO | WO 2007/013113 * | 2/2007 | ............. B29D 30/06 |
| WO | WO 2008/018098 * | 2/2008 | ............. B29D 30/16 |
| WO | WO 2008/043382 * | 4/2008 | ............. B29D 30/10 |
| WO | WO 2008/043382 A1 | 4/2008 | |
| WO | WO 2009/040594 A1 | 4/2009 | |
| WO | WO 2009/068939 * | 6/2009 | ............. B29D 30/16 |

OTHER PUBLICATIONS

Machine generated English language translation of JP 2006-297778 (original document dated Nov. 2006) (Year: 2006).*
Decision on Grant Patent for Invention dated Oct. 16, 2015, by the Federal Service for Intellectual Property in corresponding Russian Patent Application No. 2012125821/05(039727).
English-language translation of Decision on Grant Patent for Invention dated Oct. 16, 2015, by the Federal Service for Intellectual Property in corresponding Russian Patent Application No. 2012125821/05(039727).
English-language translation of Notice of Reasons for Rejection dated Nov. 5, 2014 by Japan Patent Office in corresponding Application No. JP 2012-543926 (7 pages).
English-language translation of Notification of the Second Office Action dated Jan. 22, 2015 by the State Intellectual Property Office of the People's Republic of China in corresponding Application No. CN 201080058365.5 (8 pages).
International Search Report dated Apr. 13, 2011 by the European Patent Office in corresponding International Patent Application No. PCT/IB2010/055165.
Machine-generated English-language translation of JP 2006-29778 (original document dated Nov. 2006).
Notice of Reasons for Rejection dated Nov. 5, 2014 by Japan Patent Office in corresponding Application No. JP 2012-543926 (6 pages).
Notification of the Second Office Action dated Jan. 22, 2015 by the State Intellectual Property Office of the People's Republic of China in corresponding Application No. CN 201080058365.5 (6 pages).
Office Action dated Jun. 12, 2015 by the Mexican Patent Office in corresponding application No. MX/a/2012/007198 (4 pages).
English-language translation of Office Action dated Jun. 12, 2015 by the Mexican Patent Office in corresponding application No. MX/a/2012/027198 (14 pages).
Notice of Preliminary Rejection from the Korean Intellectual Property Office, in counterpart Korean Application No. 10-2012-7019194 dated Apr. 19, 2017.
English-language translation of Notification of the First Office Action dated Mar. 18, 2014 by the State Intellectual Property Office of the People's Republic of China in corresponding Application No. CN 201080058364.5 (15 pages).
Notification of the First Office Action dated Mar. 18, 2014 by the State Intellectual Property Office of the People's Republic of China in corresponding Application No. CN 201080058364.5 (11 pages).

* cited by examiner

PROCESS AND PLANT FOR BUILDING TYRES

CROSS REFERENCE TO RELATED APPLICATIONS

This is a division of U.S. application Ser. No. 13/517,499, filed Jun. 20, 2012, which is a national phase application based on PCT/18201 0/055165, filed Nov. 15, 2010, which claims the benefit of U.S. Provisional Application No. 61/282,314, filed Jan. 20, 2010, and the priority of Italian Patent Application No. MI2009A002241, filed Dec. 21, 2009, all of which are incorporated herein by reference.

DESCRIPTION

The present invention relates to a process and a plant for building tyres. In greater detail, the invention concerns a method, a process and the equipment used for building the green tyre, to be subsequently submitted to a curing cycle for obtaining the final product.

A tyre for vehicle wheels generally comprises a carcass structure including at least one carcass ply having respectively opposite end flaps in engagement with respective annular anchoring structures, integrated into the regions usually identified with the name of "beads", and having an inner diameter substantially corresponding to a so-called "fitting diameter" of the tyre on a respective rim.

Associated with the carcass structure is a belt structure comprising one or more belt layers, disposed in radial superposed relationship relative to each other and to the carcass ply, and having textile or metallic reinforcing cords with a crossed orientation and/or substantially parallel to the circumferential extension direction of the tyre. At a position radially external to the belt structure, a tread band is applied which is of elastomeric material too, like other semi finished products constituting the tyre.

In addition, respective sidewalls of elastomeric material are applied at an axially external position to the side surfaces of the carcass structure, each extending from one of the side edges of the tread band until close to the respective annular anchoring structure to the beads. In tyres of the "tubeless" type, an airtight coating layer, usually named "liner" covers the inner surfaces of the tyre.

After building of the green tyre, carried out through assembly of respective components, a curing and molding treatment is generally carried out which aims at determining the structural stabilisation of the tyre by cross-linking of the elastomeric compounds, and impressing a desired tread pattern on the tyre as well as possible distinctive graphic marks at the tyre sidewalls.

EP 1 312 462 discloses a building system wherein along a production line there is a ply-feeding station, a carcass-building station, an assembling station and a belt building station equipped with respective drums. Transport members movable along the production line carry out transfer of the workplaces from a work station to another, removing the workpiece from a drum for placing it on the drum of the following station.

EP 1 481 791 discloses a tyre production system comprising a plurality of carcass-building stations distributed to a given mutual distance for forming the carcass structures on respective carcass-building drums sequentially transferred along a carcass-building line. Along a belt-producing line the belt structures provided with tread band are formed on respective belt-building drums sequentially moved between belt-building stations to a predetermined distance from each other. The carcasses and belts are mutually assembled within a curing mold.

WO 2009/040594, in the name of the same Applicant, discloses a plant and a process for producing tyres, comprising the following steps: a) forming a carcass structure of a green tyre on a first building drum in at least one carcass-building line; b) forming a crown structure on an auxiliary drum in at least one crown structure-building line; c) shaping the carcase structure into a toroidal configuration for coupling it to the crown structure in at least one assembling and shaping station of the tyre being processed. Operation of the assembling and shaping station is synchronised with that of the carcass-building line and the crown structure-building line. Each carcass structure is maintained in engagement on the respective building drum at least until completion of the shaping step. The built tyre is cured and molded in a curing and molding line separated from the assembling and shaping station.

In connection with processes and plants like those illustrated above, in particular those of the type disclosed in WO 2009/040594, the Applicant has judged it of importance to try to increase the daily productivity for tyres different from each other in terms of size and structure, while maintaining a high operating flexibility of the production itself.

More specifically, by "operating flexibility" in this context it is intended the possibility of using basic semifinished products for each tyre (i.e. continuous elongated elements or elements cut to size of elastomeric material only, and of elastomeric material reinforced with textile or metallic cords disposed along the longitudinal direction of the element itself), which semifinished products are different from each other as regards the type of elastomeric material and/or the type of textile or metallic reinforcing cords, and also as regards the sizes and amounts of the basic semifinished products within the individual tyres.

The Applicant has also ascertained that the processes and apparatus conceived in accordance with the above mentioned documents for example, do not allow an optimal exploitation of the capacities of the apparatuses intended for treating the tyre in the different work stations.

In particular, there are work stations in which the cycle time intervening between starting of working of one tyre and starting of working of a following tyre, is greater than the cycle time required in other work stations.

In this context, the Applicant has found that the productivity of the whole plant appears to be conditioned by the greater cycle time required in some work stations, while other work stations could also meet a greater productivity and therefore appear not to be exploited according to their real capacities.

The Applicant has also understood that interventions aiming at reducing the time required for completing a working cycle are necessary, in particular in the work stations usually calling for a higher cycle time, so as to improve productivity of the whole plant, while at the same time increasing the exploitation of the other work stations basically requiring a lower cycle time.

In more detail, the Applicant has perceived the possibility of greatly reducing the time required for completing a working cycle without inducing any penalty in the production quality and flexibility, by optimising the operations and equipment for loading and unloading the forming drums in the work stations.

More specifically, the Applicant has found that if in at least one of the work stations, at least one of the forming drums entering and exiting the same work station respectively is provided to be transferred to an intermediate transfer location, before being engaged in the proper working location or, respectively, being definitively moved away from the work station, the time for completing a working cycle is greatly reduced, every design specification being however maintained.

In greater detail, in a first aspect, the invention relates to a method of controlling the production cycle of a plant for manufacturing tyres, said plant providing a plurality of working locations, at least one first working location being associated with at least two loading/unloading locations, a proximal one and a distal one respectively, each of said working locations and loading/unloading locations being associable with a forming drum, said method comprising:

(i) loading a first forming drum into said at least one first working location (4a);

(ii) loading a second forming drum (2b) into said distal loading/unloading location;

(iii) at the end of the working provided in said at least one first working location (4a), unloading said first forming drum (2a) into said proximal loading/unloading location.

In accordance with a second aspect, the invention relates to a process for building tyres involving use of a plurality of forming drums, each designed to carry a tyre being processed and at least one work station intended for carrying out at least one respective process working on the tyre being processed, wherein transfer of at least one first and one second forming drum close to said at least one work station involves:

picking up the second forming drum from an entry location, which drum is to be submitted to one of said process workings in a first working location being part of the work station itself;

picking up the first forming drum from the first working location, which drum has been submitted to said process working in the first working location itself;

engaging the second forming drum in the first working location;

transferring the first forming drum to an exit location;

wherein at least one of said second forming drum and first forming drum is transferred to an intermediate transfer location before being engaged in the first working location or transferred to the exit location, respectively.

In accordance with a third aspect, the present invention relates to a plant for building tyres for vehicle wheels, comprising:

at least one work station having at least one first working location associable with a forming drum;

at least two forming drums;

at least one intermediate handling device for said forming drums;

wherein, under steady conditions, a first forming drum is associated with said first working location, a second forming drum being associated with said intermediate handling device;

at least said first forming drum being associated with said intermediate handling device before the first forming drum is transferred to an exit location.

It is the Applicant's opinion that in this way it is possible to minimise the time intervening between removal of the outgoing forming drum and engagement of the incoming forming drum, using at least one auxiliary handling device designed to retain the incoming forming drum or the outgoing forming drum, while at least one primary handling device carries out removal of the outgoing forming drum or introduction of the incoming forming drum respectively, from and into the work station.

The present invention, in at least one of the aforesaid aspects, can have one or more of the preferred features hereinafter described.

Provision can be made for the following additional functions of:

(iv) mutually inverting the distal and proximal loading/unloading locations associated with said second forming drum and first forming drum, respectively;

(v) unloading said first forming drum from the distal location resulting from the preceding inversion.

Preferably, functions (i), (ii), (iii), (iv), (v) are carried out repetitively.

At least one second working location can be associated with at least two respective loading/unloading locations, wherein each of said first and second working locations forms a distinct and independent assembly with respect to the other working location (4a, 4b).

Preferably, at least one second working location is provided wherein said first and second working locations are associated with the same at least two loading/unloading locations.

Also provided can be the function of:

(vi) unloading the second forming drum from the distal location.

Preferably, function (vi) precedes function (iii).

According to a preferred embodiment, each forming drum is transferred from each work station to the following work station.

Preferably, the second forming drum is picked up from the entry location before the first forming drum has been picked up from the first working location.

According to a different preferred embodiment, the second forming drum is released in the first working location or in the intermediate transfer location before the first forming drum has been released in the exit location.

Preferably, transfer of said first forming drum to the intermediate transfer location comprises: picking up the first forming drum from the first working location by means of a grip member carried by a supporting structure, said supporting structure being alternately movable, relative to the first working location, between a first position and a second position, for translation of the first forming drum from the first working location to the intermediate transfer location.

Preferably, engagement of said second forming drum in the first working location comprises: picking up the second forming drum from the intermediate transfer location by means of a first grip member carried by a supporting structure, said supporting structure being alternately movable relative to the first working location between a first position and a second position, for translation of the second forming drum from the intermediate transfer location to the first working location.

In a variant, engagement of the second forming drum in the first working location comprises: transferring the second forming drum from the entry location to the intermediate transfer location; picking up the second forming drum from the intermediate transfer location, by means of a first grip member interconnected with a second grip member by a movable supporting structure; translating the movable supporting structure to the first working location for picking up the first forming drum from the first working location by means of said second grip member; inverting the mutual positioning of said first and second grip members for bringing the second forming drum to the first working location; translating the movable supporting structure away from the first working location so as to transfer the first forming drum to the intermediate transfer position.

In a different preferred embodiment, provision is made for: picking up a third forming drum from the entry location, which drum is to be submitted to one of said process workings in a second working location being part of said work station: picking up a fourth forming drum submitted to the process working in the work station, from the second working location; engaging the third forming drum in said second working location simultaneously with transfer of the fourth forming drum to the intermediate transfer station.

According to a preferred embodiment, picking up of the third forming drum and the fourth forming drum are carried out by said first grip member and second grip member, respectively.

In greater detail, the third forming drum is preferably picked up after the first forming drum has been released into the intermediate transfer location.

Preferably, the first forming drum and fourth forming drum are picked up from the first working location and the second working location respectively, by a first grip member and a second grip member carried by a supporting structure, which supporting structure is alternately movable relative to the working locations between a first position and a second position, to cause translation of the first forming drum and the fourth forming drum from the respective working location to the intermediate transfer location.

In a further variant, the first forming drum and fourth forming drum are picked up from the first working location and the second working location respectively, by a first grip member and a second grip member carried by a first supporting structure and a second supporting structure respectively, each of said first and second supporting structures being alternately movable relative to the working locations between a first position and a second position, for causing translation of the first forming drum and the fourth forming drum respectively, from the respective working location to the intermediate transfer location.

Preferably, the second grip member picks up the fourth forming drum when the first grip member is in the intermediate transfer location.

Preferably, said first forming drum and second forming drum are associated with said intermediate handling device before the first forming drum is transferred to an exit location.

Preferably, said first forming drum and second forming drum are associated with said intermediate handling device before said second forming drum is associated with said first working location.

In greater detail, the intermediate handling device is preferably designed to transfer the second forming drum from an intermediate transfer location to said first working location and/or to transfer the first forming drum from the first working location to the intermediate transfer location.

At least one primary handling device may be also provided for transferring the second forming drum from an entry location to the intermediate transfer location and/or for transferring the first forming drum from the intermediate transfer location to an exit location.

According to a preferred embodiment, it is also provided at least one primary handling device for transferring the second forming drum from an entry location to the first working location and/or transferring the first forming drum from the first working location to an exit location.

The intermediate handling device preferably comprises: at least one first grip member suitable for engagement with each forming drum; at least one supporting structure carrying said first grip member and alternately movable relative to said at least one first working location between a first position and a second position, for causing translation of said at least one first grip member between the intermediate transfer location and the first working location.

In a variant, the intermediate handling device comprises at least two symmetrically opposite grip members.

Preferably, the intermediate handling device is interlocked with said first working location and a second working location.

Preferably, said first and second working locations are symmetrically disposed relative to the intermediate transfer location.

In a possible embodiment, said intermediate handling device comprises a first grip member and a second grip member interlocked with said first working location and a second working location being part of the work station, respectively.

Preferably, each of said grip members operates in a respective working location when the other grip member is in the intermediate transfer location.

Said at least two grip members are preferably carried by a rotating structure hinged on the supporting structure according to a first rotation axis.

Preferably, said first rotation axis is disposed to a central position relative to the grip members.

Preferably, the supporting structure is rotatable about a second rotation axis orthogonal to said first rotation axis.

Preferably, the supporting structure is movable in a first direction away from the first working location, and a second direction perpendicular to the first direction.

Preferably, said primary handling device comprises a robotized arm.

Further features and advantages will become more apparent from the detailed description of some preferred but not exclusive examples embodying the present invention. This description will be set out herein after with reference to the accompanying drawings, given by way of non-limiting example, in which.

Figure 1:
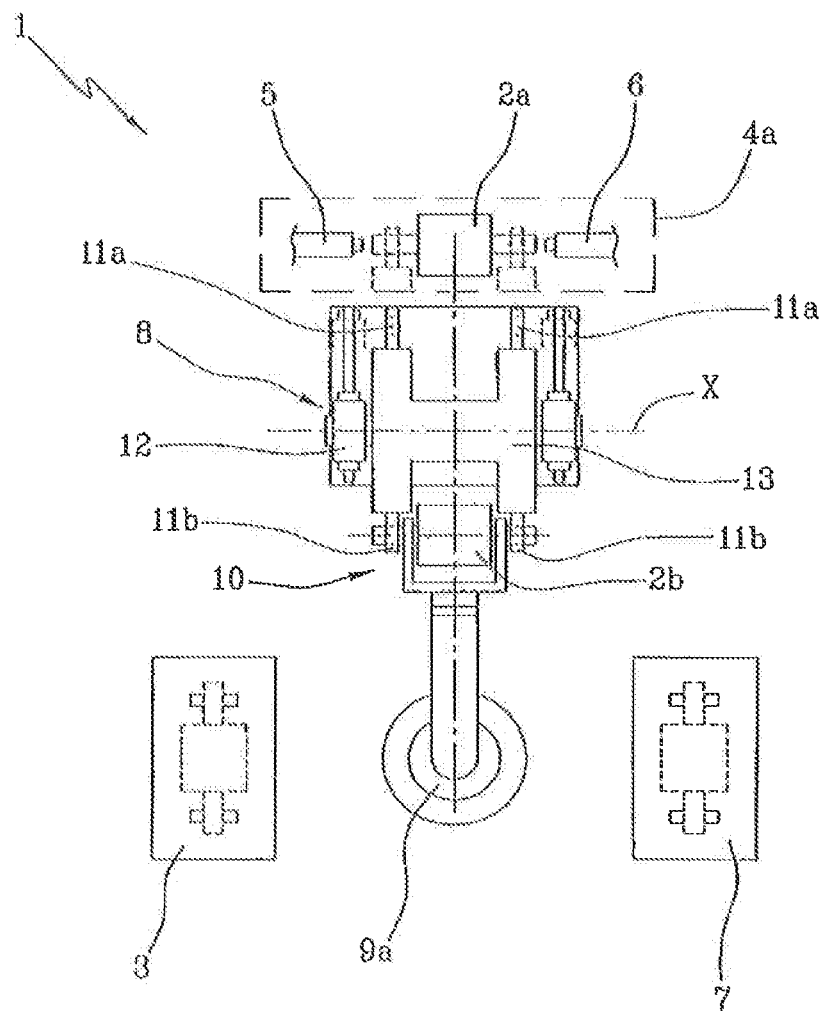
FIG. 1 shows a top diagram of a work station being part of a plant for building tyres, made in accordance with the present invention.

With reference to the accompanying drawings, a work station being part of a plant for building tyres, not shown on the whole as not of importance to the aims of the present invention has been generally denoted by 1. In said plant at least two forming drums 2a, 2b, 2c, 2d are moved following a predetermined path through one or more of said work stations 1, intended for carrying out respective process workings.

Each forming drum 2a, 2b, 2c, 2d is adapted to support a tyre being processed, directly formed on the forming drum by deposition and/or handling of different components, such as one or more carcass plies, annular reinforcing structures to the beads, one or more belt layers, tread band, sidewalls and/or others.

Each component is preferably directly formed on the forming drum 2a, 2b, 2c, 2d in addition to the previously laid components, and/or suitably handled in accordance with a predetermined process working carried out in the respective work station 1, until obtaining a finished green tyre to be submitted to a curing treatment.

To the aims of the present specification and the following claims, by "tyre being processed" it is also intended a forming drum 2a, 2b, 2c, 2d that is empty and is about to receive a first tyre component concurrently with a first process working.

Transfer devices carry out transfer of each building drum from each work station 1 to the following work station.

At least one of the work stations 1 is preferably provided with at least one entry location 3, designed to sequentially receive the forming drums 2a, 2b, 2c, 2d that may come from a preceding process working. Integrated into the work station 1 is at least one first working location 4a for example comprising a chuck 5 and a tailstock 6 sequentially associable, at each work cycle, with a single forming drum 2a, 2b, 2c, 2d coming from the entry location 3 so as to submit it to the process working. At least one exit location 7 is further associated with the work station 1 for sequentially receiving the forming drums 2a, 2b, 2c, 2d previously submitted to the process working carried out by the same work station. The individual forming drums 2a, 2b, 2c, 2d received in the exit location 7 can be then transferred to a following work station 1.

At least one of said entry locations 3 and exit location 7 can be represented by the working location of an adjacent work station.

Movement of each forming drum 2a, 2b, 2c, 2d between said entry location 3, working location 4a and exit location 7 relies on at least one intermediate handling device 8, preferably cooperating with at least one primary handling device 9a, 9b consisting of a robotized arm, for example.

Referring particularly to FIG. 1, the intermediate handling device 8 is adapted to transfer a first forming drum 2a from the first working location 4a to an intermediate transfer location 10. The intermediate handling device 8 is also adapted to transfer a second forming drum 2b from the intermediate transfer location 10 to the first working location 4a.

In a possible alternative variant not shown, the intermediate handling device 8 can be entrusted with the only task of transferring the second forming drum 2b from the intermediate transfer location 10 to the first working location 4a.

Still referring in particular to FIG. 1, the primary handling device 9a is entrusted with the task of transferring the second forming drum 2b from the entry location 3 to the intermediate transfer location 10. In addition or as an alternative, the primary handling device 9a can be intended for transferring the first forming drum 2a from the intermediate transfer location 10 to the exit location 7.

Preferably, the intermediate handling device 8 comprises at least one grip member 11a, 11b defining at least two loading/unloading locations, a proximal one and a distal one relative to the first working location 4a, each associable with a forming drum 2a, 2b. In greater detail, in the example shown in FIG. 1 a first grip member 11a and a symmetrically opposite second grip member 11b are provided, each of them corresponding to one of the proximal and distal loading/unloading locations. The grip members 11a, 11 *b* are mounted on at least one supporting structure 12 which is alternately movable relative to the first working location 4a between a first position and a second position, to move the grip members 11a, 11b preferably by translation between the intermediate transfer location 10 and the first work location 4a.

In greater detail, when the supporting structure 12 is in the first position, the distal loading/unloading location represented by the second grip member 11b in FIG. 1 is coincident with the intermediate transfer location 10. When the supporting structure 12 is in the second position, the proximal loading/unloading location represented by the first grip member 11a in FIG. 1 is coincident with the first working location 4a.

The grip members 11a, 11b are carried by a rotating structure 13 hinged on the supporting structure 12 according to a first rotation axis X, which is preferably horizontal and/or centrally disposed relative to said grip members 11a, 11b.

Upon command of actuators made in known manner, the rotating structure 13 is movable through angular rotations of 180° so as to mutually invert the position of the grip members 11a, 11b and therefore the proximal and distal loading/unloading locations.

The production cycle of plant 1 is controlled following a method according to which the first forming drum 2a is loaded in the first working location 4a and the second forming drum 2b is loaded in the distal loading/unloading location. At the end of the working provided in the first working location 4a the first forming drum 2a is unloaded in the proximal loading/unloading location.

In greater detail, for transfer of the first and second forming drums 2a, 2b close to the work station 1 it is provided that, while the first forming drum 2a is associated with the first working location 4a for carrying out the process working on the respective tyre being processed, the second forming drum 2b carrying a respective tyre to be submitted to the process working is picked up from the entry location 3, by the primary handling device 9a for example, to be engaged on one of the grip members 11b of the intermediate handling device 8, at the distal loading/unloading location coincident with the intermediate transfer location 10. At the end of the process working, the supporting structure 12 of the intermediate handling device 8 carries out a translation from the first to the second positions, as shown in chain line in FIG. 1.

Consequently, the grip member 11a corresponding to the proximal loading/unloading location lends itself to engage the first forming drum 2a for unloading it from the first working location 4a. By a 180° rotation of the rotating structure 13, the proximal and distal loading/unloading locations are mutually inverted and, as a result, the mutual positioning of the first and second forming drums 2a, 2b carried by the respective grip members 11a, 1 *b* is exchanged. In more detail, the first forming drum 2a is transferred to the distal loading/unloading location, while the second forming drum 2b is transferred to the proximal loading/unloading location and engaged in the first working location 4a. Preferably, the second forming drum 2b is released in the first working location 4a simultaneously with transfer of the first forming drum 2a to the intermediate transfer location 10.

By a new translation of the supporting structure 12 to the first position, the first forming drum 2a reaches the intermediate transfer location 10 to be unloaded by the primary handling device 9a from the distal location resulting from the previous inversion and transferred to the exit location 7.

When operation is under steady conditions, while the first forming drum 2a is associated with the first working location 4a to be submitted to the respective process working, the second forming drum 2b is associated with the intermediate handling device 8. The first forming drum 2a and second forming drum 2b are both associated with the intermediate handling device 8 before transferring the first forming drum 2a to the exit location 7 and/or before associating the second forming drum 2b with the first working location 4a.

For the sake of clarity, in the following table it is reproduced, by way of non-limiting example, a possible flow chart of the forming drums 2a, 2b between the working location 4a, the proximal loading/unloading location and the distal loading/unloading location.

| Working location | Proximal loading/unloading location | Distal loading/unloading location |
|---|---|---|
| First drum | Empty | Second drum |
| Empty | First drum | Second drum |
| Empty | Second drum | First drum |
| Second drum | Empty | First drum |
| Second drum | Empty | Empty |

The work cycle starts again with the repetitive execution of the above described process functions, by loading a new first forming drum in the distal loading/unloading location coincident with the intermediate transfer location, which new forming drum will subsequently have to replace the second forming drum 2b in the working location.

In the above described sequence, the second forming drum 2b can be picked up from the entry location 3 before the first forming drum 2a has been picked up from the first working location 4a. In addition, the second forming drum 2b can be released in the first working location 4a and/or in the intermediate transfer location 10 before the first forming drum 2a has been released in the exit location 7.

Replacement of the forming drums 2a, 2b at the first working location 4a can therefore take place within a very reduced period of time.

Figure 2:
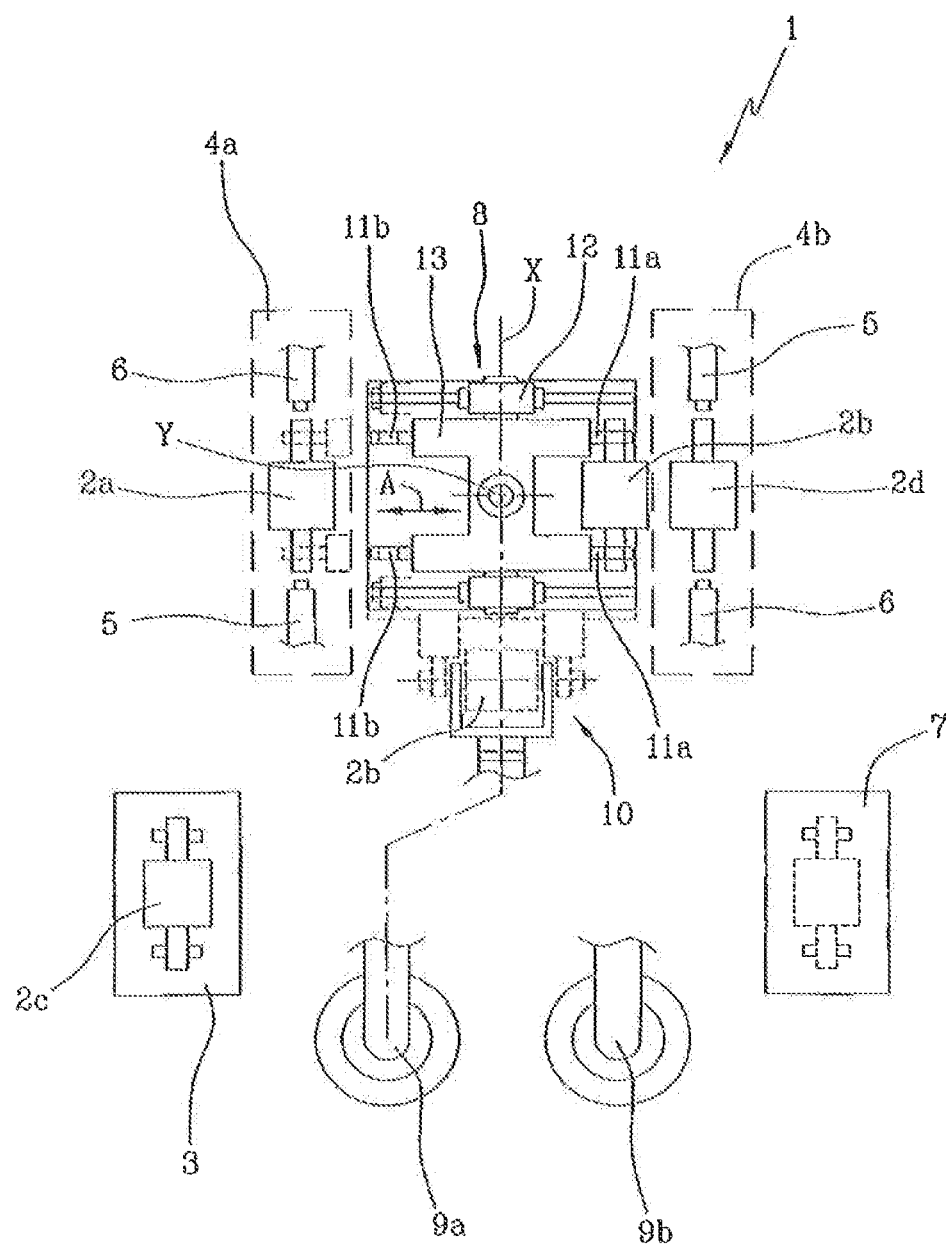
FIG. 2 shows a top diagram of a second embodiment of a work station.

FIG. 2 shows a second solution for accomplishment of the present invention. In this case, the intermediate handling device 8 is interlocked with a first working location 4a and a second working location 4b, preferably disposed symmetrically to the intermediate transfer location 10.

Figure 3:
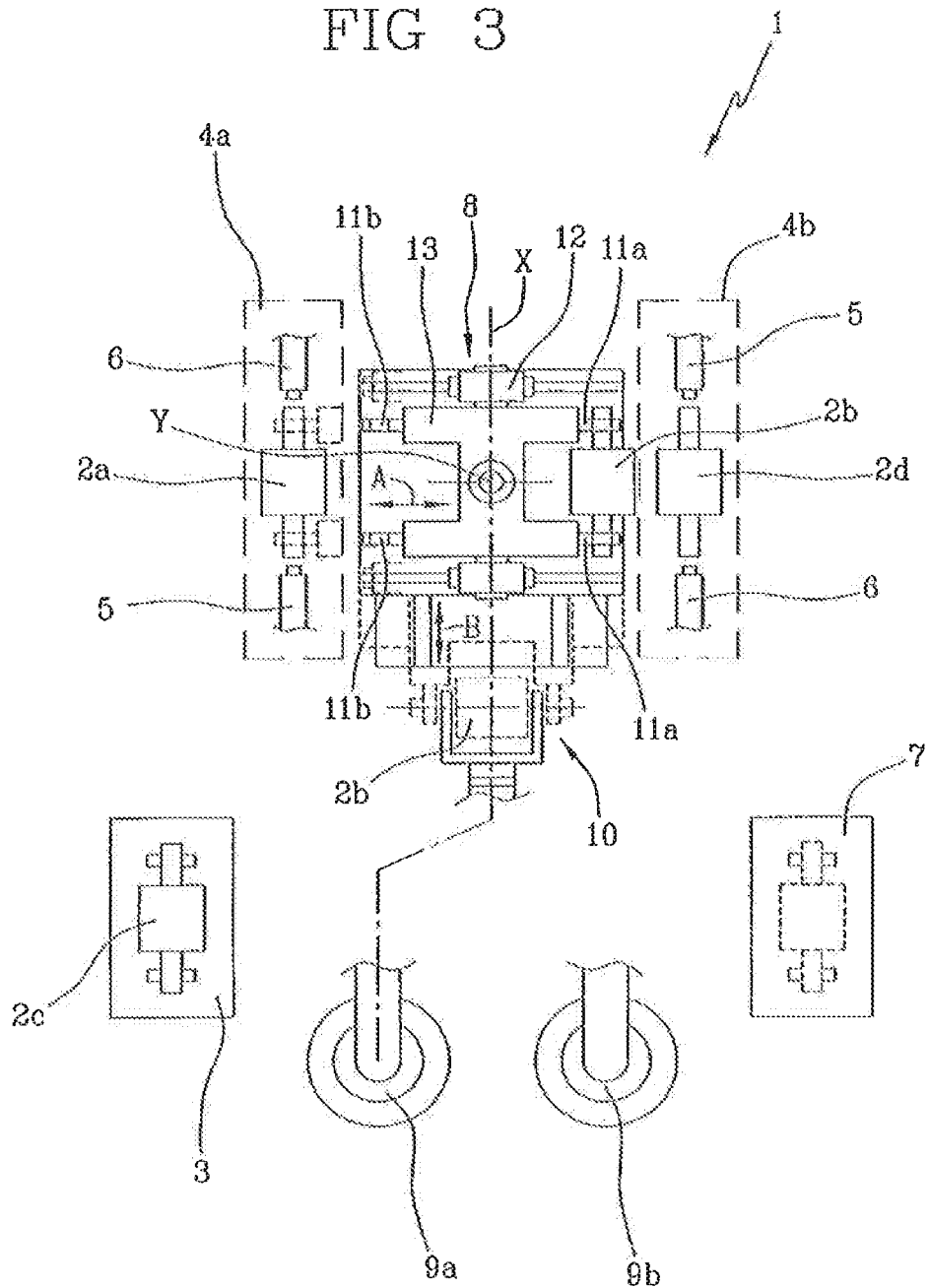
FIG. 3 shows a top diagram of a third variant of a work station.

The supporting structure 12 of the intermediate handling device 8 is movable between a first position at which one of the grip members 11a, 11b is associated with the first working location 4a, a second position at which the opposite grip member is associated with the second working location 4b and a third intermediate position, shown in FIG. 2 and FIG. 3, in which both grip members 11a, 11b are released from the respective working locations 4a, 4b.

The supporting structure 12 of the intermediate handling device 8 can rotate also about a second rotation axis Y, which is preferably vertical and/or orthogonal to the first rotation axis X. When the supporting structure 12 is in the third intermediate position, by an angular rotation through 900 for example in either way, the grip members 11a, 11b of the intermediate handling device 8 lend themselves to be individually brought to the intermediate transfer position 10.

The intermediate handling device 8 cooperates with a first primary handling device 9a designed to transfer the forming drums 2a, 2b, 2c, 2d from the entry location 3 to the intermediate transfer location 10, and a second primary handling device 9b for transfer of the forming drum 2a, 2b, 2c, 2d from the intermediate transfer location to the exit location 7. However a single primary handling device 9a interlocked with both the entry 3 and exit 7 locations can be used.

During the process working on the first forming drum 2a previously loaded in the first working location 4a, the supporting structure 12 is rotated about the second rotation axis Y as shown in chain line, so that one of the grip members 11a, 11b is brought to the intermediate transfer location 10 for receiving the second forming drum 2b picked up from the entry location 3 by the first primary handling device 9a.

By a new rotation through 90°, the second forming drum 2b is positioned in the distal loading/unloading position relative to the first working location 4a.

When the process working in the first working location 4a has been completed, the grip member positioned in the proximal loading/unloading position relative to the first working location 4a is brought into engagement with the first forming drum 2a, due to an advancing movement of the supporting structure 12.

A rotation of the supporting structure 12 through 180° around the first rotation axis X causes inversion of the grip member 11a, 11b positioning, and therefore replacement of the first forming drum 2a with the second forming drum 2b in the first work station.

The supporting structure 12 moves backwards to the third position and carries out a 90° rotation around the second rotation axis Y to bring the first forming drum 2a to the intermediate transfer position so that said first drum can be picked up by the second primary handling device 9b and be transferred to the exit location 7.

Thus a third forming drum 2c, picked up from the intermediate transfer location 10 by the first primary handling device 9a can be positioned on the grip member 11a cleared from the first forming drum 2a.

The supporting structure 12 rotates again around the second rotation axis Y bringing the third forming drum 2c to the distal loading/unloading position relative to the second working location 4b, where a process working is about to be completed on a previously loaded fourth forming drum 2d.

When the process working in the second working location 4b has been completed, the grip member positioned in the proximal loading/unloading position relative to the second working location 4b is brought into engagement with the fourth forming drum 2d, due to moving forward of the supporting structure 12.

A new rotation of the supporting structure 12 through 180° about the first rotation axis X causes inversion of the positioning of the grip members 11a, 11b and consequently replacement of the fourth forming drum 2d with the third forming drum 2c in the second working location 4b.

The supporting structure 12 moves backwards again to the third position and rotates through 90° around the second rotation axis Y to bring the fourth forming drum 2d to the intermediate transfer location 10, which drum 2d is thus picked up by the second primary handling device 9b to be transferred to the exit location 7.

A new forming drum picked up from the entry location 3 by the first primary handling device 9a will be loaded on the grip member in the intermediate transfer location 10, giving rise to a new work cycle.

Thus it is possible to interlock two working locations 4a, 4b in the same work station 1, both associated with the loading/unloading locations of the same intermediate handling device 8.

Unlike the solution described with reference to FIG. 2, in a third variant shown in FIG. 3 the supporting structure 12 of the intermediate handling device 8 is movable along a first direction "A" away from and close to each of the working locations 4a, 4b, and in addition along a second direction "B" perpendicular to the first direction.

This situation, as compared with the example shown in FIG. 2, enables the positioning of the intermediate transfer location 10 to be moved away from the working locations 4a, 4b, so that movement of the primary handling devices 9a, 9b is not hindered by the bulkiness of said working locations 4a, 4b. The intermediate handling device 8 in fact can be brought out of the space included between the two working locations 4a, 4b for reaching the intermediate transfer location 10 disposed relatively away from the working locations 4a, 4b.

Figure 4:
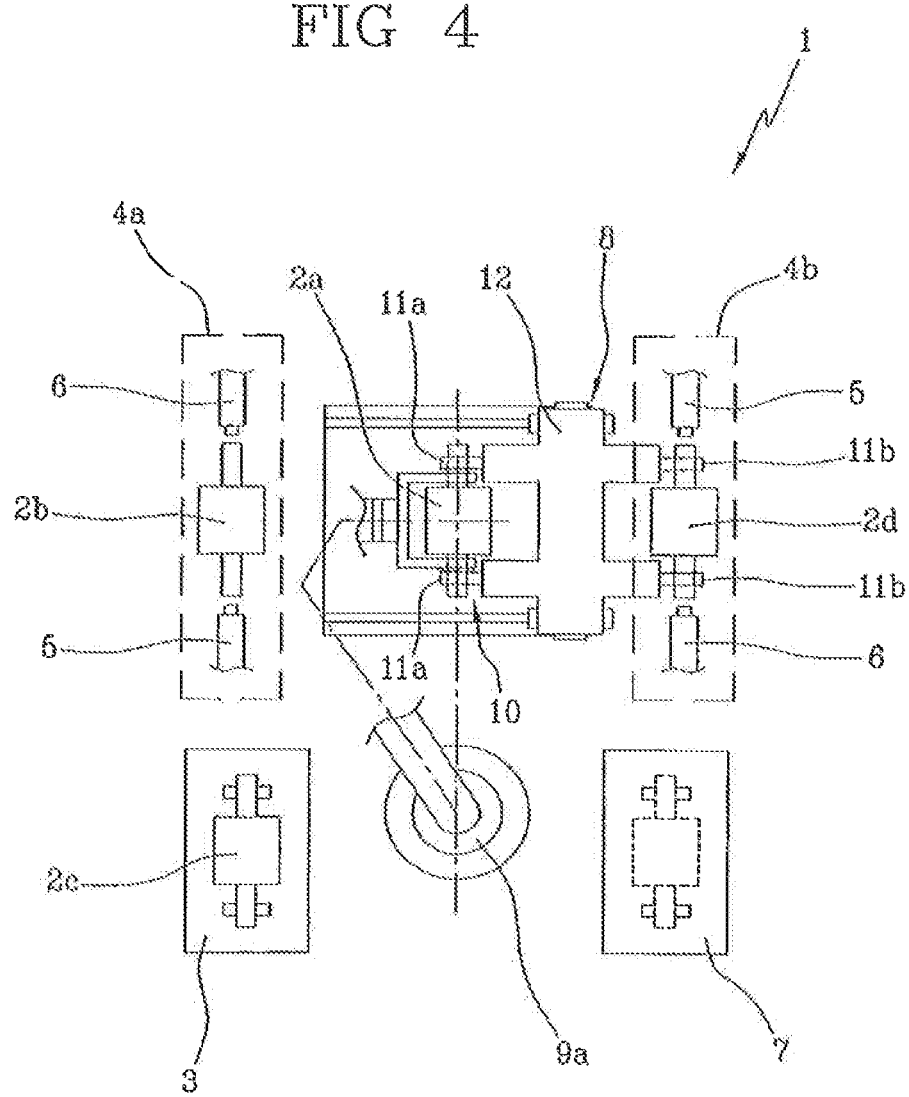
FIG. 4 is a top diagram of a fourth variant of a work station.

FIG. 4 shows a fourth example for accomplishment of the present invention, in which the intermediate handling device 8 comprises a first grip member 11a and a second grip member 11b interlocked with the first working location 4a and the second working location 4b, respectively.

The supporting structure 12 of the intermediate handling device 8 is alternately movable, preferably in the absence of the rotations around the first and/or the second rotation axes X, Y described above with reference to the solutions shown in FIGS. 1-3, between a first position at which the first grip member 11a operates in the first working location 4a (corresponding to a proximal loading/unloading location relative to said first working location 4a) while the second grip member 11b is in the intermediate transfer location 10 (corresponding to a distal loading/unloading location relative to said first working location 4a), and a second position at which, as shown, the second grip member 11b operates in the second working location 4b (corresponding to a distal loading/unloading location relative to said first working location 4a), while the first grip member 11a is in the intermediate transfer location 10 (corresponding to a proximal loading/unloading location relative to said first working location 4a).

The first forming drum 2a and fourth forming drum 2d can therefore be picked up by the first grip member 11a and the second grip member 11b respectively, to be each transferred from the respective working location to the intermediate transfer location 10.

At least one primary handling device 9a operates on said entry location 3, exit location 7, first working location 4a, second working location 4b and intermediate transfer location 10.

The first forming drum 2a is picked up from the entry location 3 and loaded on the first working location 4a upon the action of the primary handling device 9a, while in the second working location 4b the process working is being carried out on the fourth forming drum 2d.

While the process working on the first forming drum 2a previously loaded into the first working location 4a is about to come to an end, the primary handling device 9a picks up the second forming drum 2b from the entry location 3 and takes it close to the first working location 4a, making it ready for loading thereon. At the end of the process working in the first working location 4a, the intermediate handling device 8 picks up the first forming drum 2a by the first grip member 11a and, moving away by translation from the first working location 4a, transfers the drum itself to the intermediate transfer location 10, making the second grip member 11b ready for picking up the fourth forming drum that is about to be treated in the second working location 4b.

Meanwhile, the primary handling device 9a is loading the second forming drum 2b into the first working location 4a. The primary handling device 9a then reaches the intermediate transfer location for picking up the first forming drum 2a, as shown in FIG. 4, and transferring it to the exit location 7.

Afterwards, the primary handling device 9a picks up the third forming drum 2c from the entry location 3, to move it close to the second working location 4b, wherein the process working on the fourth forming drum 2d is about to come to an end. At the end of this process working, the fourth forming drum 2d is picked up by the intermediate handling device through the second grip member 11b and transferred to the intermediate transfer location 10, while the first grip member 11a gets ready to pick up the second forming drum 2b in the first working location 4a. The primary handling device 9a releases the third forming drum 2c in the second working location 4b and then reaches the intermediate transfer location 10 for picking up the fourth forming drum 2d and transfer it to the exit location 7.

The primary handling device 9a reaches the entry location 3 again, for picking up a new building drum and starting a new work cycle.

Therefore it is possible to manage the flow of the forming drums 2a, 2b, 2c, 2d in the first and second working locations 4a, 4b using only one primary handling device 9a and only one intermediate handling device 8 of simplified structure.

Figure 5:
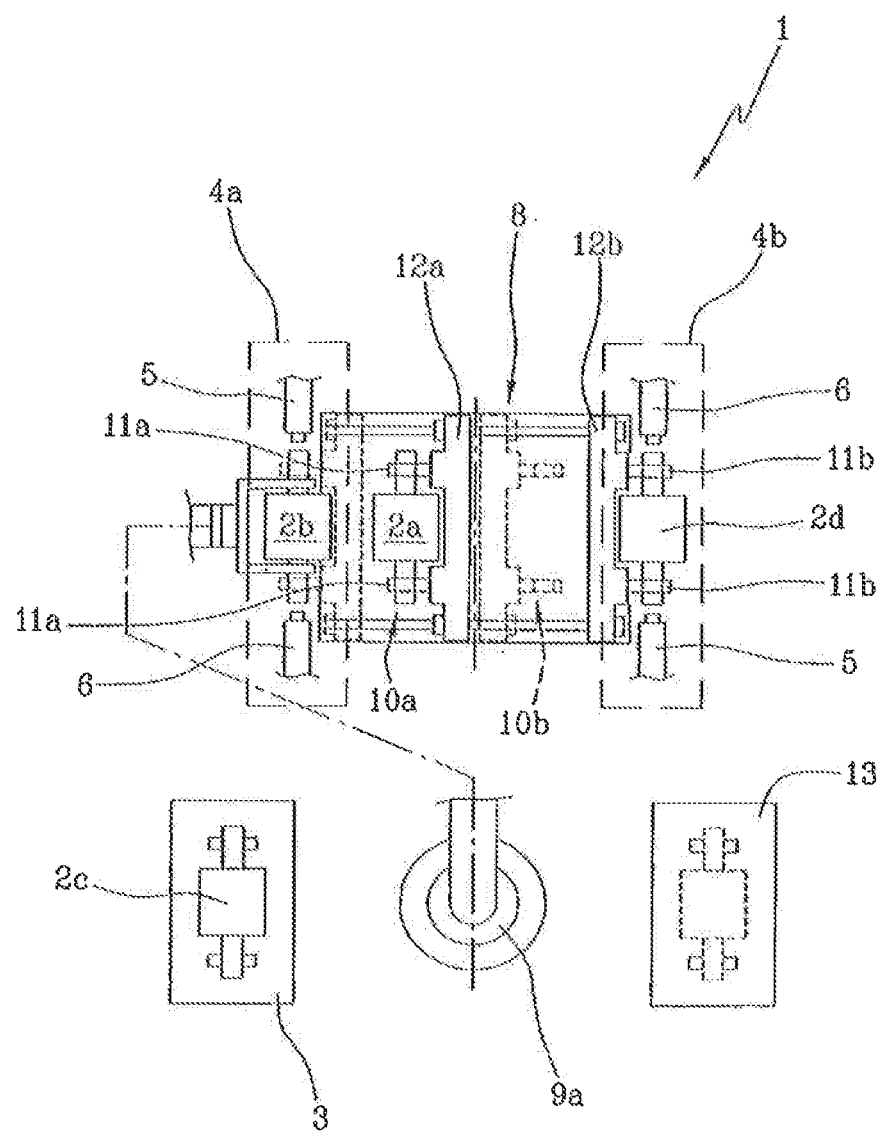
FIG. 5 shows a top diagram of a fifth variant of a work station.

FIG. 5 shows a fifth example for accomplishment of the invention. Unlike what is described above with reference to FIG. 4, the first and second grip members of the intermediate handling device 8 are carried by a first supporting structure 12a and a second supporting structure 12b, respectively. Each supporting structure 12a, 12b is alternately movable from and towards the respective first and second working locations 4a, 4b, between a first position and a second position for causing translation of the respective forming drum 2a, 2b, 2c, 2d from the first and second working locations 4a, 4b to a respective first and second intermediate transfer location 10a, 10b, disposed to a closely spaced distance or possibly being coincident with each other.

Each of the first and second working locations 4a, 4b therefore forms, together with the respective supporting structure 12a, 12b of the intermediate handling device 8, a distinct and independent assembly with respect to the other working location, which assembly is interlocked with at least the same primary handling device 9a in the same work station 1.

In the example shown, a single primary handling device 9a cooperates with both the movable structures 10a, 10b for serving both the working locations 4a, 4b, in the same manner as described with reference to FIG. 4. In accordance with a possible variant not shown, also applicable to the example in FIG. 4, a first and a second handling device 9a, 9b can be provided which are respectively designed for loading of the forming drums 2a, 2b, 2c, 2d from the entry location 3 to the working locations 4a, 4b, and unloading of the forming drums 2a, 2b, 2c, 2d from the respective intermediate transfer locations 10a, 10b to the exit location 7, in the same manner as explained with reference to FIGS. 2 and 3.

In the example shown, the first and second supporting structures 12a, 12b of the intermediate handling device 8 are movable along the same direction between the working locations 4a, 4b disposed in mirror image relationship with each other. In a possible variant, the movement trajectories can respectively take an angled orientation, at 90° for example, for meeting different layout requirements of the plant.

The invention claimed is:

1. A process for building tyres comprising using a plurality of forming drums, wherein each forming drum is capable of carrying a tyre being processed, and a first work station comprising a first and a second working location, wherein the process for building tyres further comprises:

submitting a first forming drum to a first process working in the first working location of the first work station;

transferring the first forming drum from the first working location to a first intermediate transfer location of the first work station and a second forming drum to the first work station, wherein transferring comprises:

picking up, by a primary handling device, the second forming drum from an entry location of the first work station, wherein the second forming drum is submitted to the first process working in the first working location;

picking up the first forming drum from the first working location;

transferring and releasing the second forming drum to the first working location, wherein at least one of:

the first forming drum is transferred, by translation and by a first grip member carried by a first support structure of an intermediate handling device, from the first working location to the first intermediate transfer location and released in the first intermediate transfer location to the primary handling device before being transferred and released by the primary handling device to an exit location of the first work station; or the second forming drum is transferred by the primary handling device to the first intermediate transfer location and released in the first intermediate transfer location to the first support structure of the intermediate handling device before being transferred, by translation, and released by the first intermediate handling device to the first working location;

transferring and releasing, by the primary handling device, the first forming drum to the exit location before the first forming drum is transferred from the first work station to a second work station, wherein the second work station is configured for carrying out a second process working on the tyre being processed;

submitting a third forming drum to a third process working in the second working location of the first work station; and transferring the third forming drum from the second working location to a second intermediate transfer location of the first work station and a fourth forming drum to the first work station, wherein transferring comprises:

picking up, by the primary handling device, the fourth forming drum from the entry location of the first work station;

picking up, by a second grip member carried by a second support structure of the intermediate handling device, the third forming drum from the second working location, the second support structure configured to translate independently from the first support structure;

translating, relative to the second working location, the second support structure to transfer the third forming drum from the second working location to the second intermediate transfer location;

transferring, by the primary handling device, the fourth forming drum to the second working location; and releasing, by the primary handling device, the fourth forming drum to the second working location.

2. The process as claimed in claim 1, wherein the second forming drum is picked up from the entry location by the primary handling device before the first forming drum has been picked up from the first working location.

3. The process as claimed in claim 2, wherein the second forming drum is released in the first working location or in the first intermediate transfer location before the first forming drum has been released in the exit location.

4. The process as claimed in claim 1, wherein the second forming drum is released in the first working location simultaneously with transfer of the first forming drum to the first intermediate transfer location.

5. The process as claimed in claim 1, wherein:

the first forming drum is transferred by the intermediate handling device to the first intermediate transfer location and released in the first intermediate transfer location to the primary handling device, the transfer of the first forming drum to the first intermediate transfer location comprising:

picking up the first forming drum from the first working location by the first grip member of the intermediate handling device.

6. The process as claimed in claim 1, wherein transfer, by translation, and release of the second forming drum to the first working location comprises: picking up the second forming drum from the first intermediate transfer location by the first grip member carried by the first support structure, the first support structure being alternately movable relative to the first working location between a first position and a second position, for translation of the second forming drum from the first intermediate transfer location to the first working location.

7. The process as claimed in claim 1, wherein the third forming drum is picked up after the first forming drum has been released into the first intermediate transfer location.

8. The process as claimed in claim 1, wherein:

the first forming drum is picked up from the first working location by the first grip member carried by the first support structure of the intermediate handling device, which first supporting structure is alternately movable relative to the first working location between a first position and a second position, to cause translation of the first forming drum from the first working location to the first intermediate transfer location.

9. The process as claimed in claim 1, wherein the second grip member picks up the third forming drum when the first grip member is in the first intermediate transfer location.

10. The process as claimed in claim 1, wherein a transfer device transfers the first forming drum from the exit location to the second work station.

11. The process as claimed in claim 1, wherein:

the second forming drum is released to the first working location by the primary handling device while the first forming drum is simultaneously transferred to the first intermediate transfer location by the intermediate handling device; and the first forming drum is released by the intermediate handling device to the primary handling device at the first intermediate transfer location after the primary handling device releases the second forming drum to the first working location.

12. A process for building tyres comprising using a plurality of forming drums, wherein each forming drum is capable of carrying a tyre being processed, and a first work station comprising a first and a second working location, wherein the process for building tyres further comprises:

submitting a first forming drum to a first process working in the first working location of the first work station;

transferring the first forming drum from the first working location to a first intermediate transfer location of the first work station and a second forming drum to the first work station wherein transferring comprises:
  picking up, by a primary handling device, the second forming drum from an entry location of the first work station;
  picking up the first forming drum from the first working location;
  transferring and releasing the second forming drum to the first working location,
  wherein at least one of:
    the first forming drum is transferred, by translation and by a first grip member carried by a first support structure of an intermediate handling device, from the first working location to the first intermediate transfer location and released in the first intermediate transfer location to the primary handling device before being transferred and released by the primary handling device to an exit location of the first work station; or
    the second forming drum is transferred by the primary handling device to the first intermediate transfer location and released in the first intermediate transfer location to the first support structure of the intermediate handling device before being transferred, by translation, and released by the first intermediate handling device to the first working location;
transferring and releasing, by the primary handling device, the first forming drum to the exit location before the first forming drum is transferred from the first work station to a second work station, wherein the second work station is configured for carrying out a second process working on the tyre being processed;
submitting a third forming drum to a third process working in the second working location of the first work station; and
transferring the third forming drum from the second working location to a second intermediate transfer location of the first work station and a fourth forming drum to the first work station, wherein transferring comprises:
  picking up, by the primary handling device, the fourth forming drum from the entry location;
  transferring and releasing, by the primary handling device, the fourth forming drum to a second support structure of the intermediate handling device at the second intermediate transfer location, the second support structure configured to translate independently from the first support structure;
  picking up, by the primary handling device, the third forming drum at the second working location of the first work station; and
  translating, relative to the second working location, the second support structure to transfer the fourth forming drum from the second intermediate transfer location to the second working location; and
  releasing, by the second support structure, the fourth forming drum to the second working location.

\* \* \* \* \*